US011184817B2

(12) United States Patent
Landais et al.

(10) Patent No.: US 11,184,817 B2
(45) Date of Patent: Nov. 23, 2021

(54) SUPPORT OF MOBILE-TERMINATED COMMUNICATION IN AN EVOLVED PACKET SYSTEM

(71) Applicant: Alcatel Lucent, Boulogne-Billancourt (FR)

(72) Inventors: Bruno Landais, Lannion (FR); Alessio Casati, Swindon (GB)

(73) Assignee: Nokia Technologies Oy, Espoo (FI)

( * ) Notice: Subject to any disclaimer, the term of this patent is extended or adjusted under 35 U.S.C. 154(b) by 303 days.

(21) Appl. No.: 15/524,154

(22) PCT Filed: Nov. 2, 2015

(86) PCT No.: PCT/EP2015/075468
§ 371 (c)(1),
(2) Date: May 3, 2017

(87) PCT Pub. No.: WO2016/071280
PCT Pub. Date: May 12, 2016

(65) Prior Publication Data
US 2017/0339611 A1 Nov. 23, 2017

(30) Foreign Application Priority Data
Nov. 4, 2014 (EP) .................................... 14306767

(51) Int. Cl.
*H04W 28/14* (2009.01)
*H04W 36/02* (2009.01)
(Continued)

(52) U.S. Cl.
CPC ........... *H04W 36/023* (2013.01); *H04W 8/06* (2013.01); *H04W 28/14* (2013.01);
(Continued)

(58) Field of Classification Search
CPC ..... H04W 28/14; H04W 36/023; H04W 4/20; H04W 52/0216; H04W 52/0254;
(Continued)

(56) References Cited

U.S. PATENT DOCUMENTS

2015/0003312 A1    1/2015 Jeong et al.
2015/0139054 A1*   5/2015 Wu .................. H04W 52/0225
                                                 370/311
(Continued)

FOREIGN PATENT DOCUMENTS

CN    101677470 A    3/2010
CN    103458505 A    12/2013
(Continued)

OTHER PUBLICATIONS

ETSI TS 123 401 V8.18.0 (Apr. 2013) LTE; General Packet Radio Service (GPRS) enhancements for Evolved Universal Terrestrial Radio Access Network (E-UTRAN) access (3GPP TS 23.401 version 8.18.0 Release 8) (Year: 2013).*
(Continued)

*Primary Examiner* — Melvin C Marcelo
*Assistant Examiner* — Natali Pascual Peguero
(74) *Attorney, Agent, or Firm* — Harness, Dickey & Pierce, P.L.C.

(57) ABSTRACT

In an embodiment, there is provided a method for support of mobile-terminated communication in an Evolved Packet System, towards a User Equipment UE in idle mode using a power saving mechanism whereby the UE is transiently not reachable, the method includes allowing one or more Downlink DL packets received for the UE to be buffered in a Serving Gateway SGW, upon request, for up to a duration referred to as DL buffering duration.

16 Claims, 6 Drawing Sheets

Figure 1:
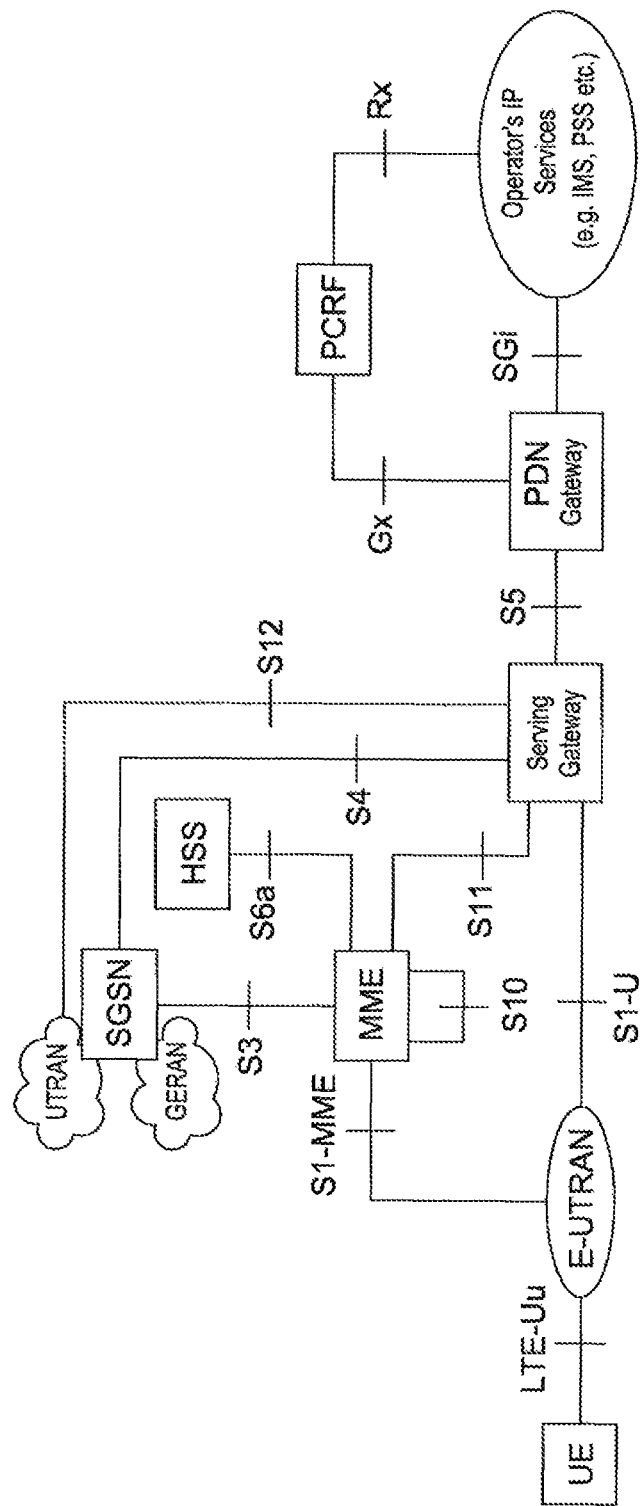

(51) Int. Cl.
| | |
|---|---|
| *H04W 4/20* | (2018.01) |
| *H04W 4/70* | (2018.01) |
| *H04W 76/28* | (2018.01) |
| *H04W 36/16* | (2009.01) |
| *H04W 52/02* | (2009.01) |
| *H04W 76/04* | (2009.01) |
| *H04W 8/06* | (2009.01) |
| *H04W 8/18* | (2009.01) |

(52) U.S. Cl.
CPC ... *H04W 52/0216* (2013.01); *H04W 52/0254* (2013.01); *H04W 8/18* (2013.01); *H04W 36/165* (2013.01); *H04W 52/0209* (2013.01); *H04W 76/28* (2018.02); *Y02D 30/70* (2020.08)

(58) Field of Classification Search
CPC . H04W 8/06; H04W 36/165; H04W 52/0209; H04W 76/28; H04W 8/18; Y02D 70/00; Y02D 70/1224; Y02D 70/1226; Y02D 70/21; Y02D 70/24
USPC ......................................................... 370/331
See application file for complete search history.

(56) References Cited

U.S. PATENT DOCUMENTS

| | | | | |
|---|---|---|---|---|
| 2015/0215887 | A1* | 7/2015 | Nejatian | ........... H04W 56/0045 370/350 |
| 2015/0282029 | A1* | 10/2015 | Faccin | ................ H04W 28/085 370/331 |

FOREIGN PATENT DOCUMENTS

| | | | | |
|---|---|---|---|---|
| EP | 2339785 | A1 * | 6/2011 | .............. H04W 4/24 |
| KR | 2013-0090831 | A | 8/2013 | |
| WO | WO-2013119021 | A1 | 8/2013 | |
| WO | WO-2013177992 | A1 | 12/2013 | |

OTHER PUBLICATIONS

Qualcomm Incorporated et al.: "New Work Item on Extended DRX cycle for Power Consumption Optimization", vol. SA WG2, No. Sapporo, Japan; Oct. 13, 2014-Oct. 17, 2014, Oct. 12, 2014 (Oct. 12, 2014), XP050880892, Retrieved from the Internet <URL:http://www.3gpp.org/ftp/Meetings_3GPP_SYNC/SA2/Docs/> [retrieved on Oct. 12, 2014].
3rd Generation Partnership Project; Technical Specification Group Services and System Aspects; Group based Enhancements; (Release 13), 3GPP Standard; 3GPP TR 23.769, 3rd Generation Partnership Project (3GPP), Mobile Competence Centre ; 650, Route Des Lucioles ; F-06921 Sophia-Antipolis Cedex ; FRANCE, vol. SA WG2, No. V0.3.1, Nov. 3, 2014 (Nov. 3, 2014), pp. 1-33, XP050926792.
Ericsson: "Potential Solution for buffering at DL transmission to PSM", vol. SA WG2, No. Sapporo, Japan; Oct. 13, 2014-Oct. 17, 2014, Oct. 12, 2014 (Oct. 12, 2014), XP050880637, Retrieved from the Internet <URL:http://www.3gpp.org/ftp/Meetings_3GPP_SYNC/SA2/Docs/> [retrieved on Oct. 12, 2014].
3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), 3GPP Standard; 3GPP TS 29.274, 3rd Generation Partnership Project (3GPP), Mobile Competence Centre ; 650, Route Des Lucioles ; F-06921 Sophia-Antipolis Cedex ; France, vol. CT WG4, No. V12.6.0, Sep. 29, 2014 (Sep. 29, 2014), pp. 1-313, XP050926316.
"3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Standard; 3GPP TS 23.401, 3rd Generation Partnership Project (3GPP), Mobile Competence Centre ; 650, Route Des Lucioles ; F-06921 Sophia-Antipolis Cedex ; France, vol. SA WG2, No. V13.0.0, Sep. 17, 2014 (Sep. 17, 2014), pp. 1-308, XP050925477.
"3rd Generation Partnership Project; Technical Specification Group Services and System Aspects; General Packet Radio Service (GPRS); Service description; Stage 2 (Release 13)", 3GPP Standard; 3GPP TS 23.060, 3rd Generation Partnership Project (3GPP), Mobile Competence Centre ; 650, Route Des Lucioles ; F-06921 Sophia-Antipolis Cedex ; France, vol. SA WG2, No. V13.0.0, Sep. 17, 2014 (Sep. 17, 2014), pp. 1-350, XP050925457.
CATT: "TAU procedure", 3GPP Draft; S2-071772, 3rd Generation Partnership Project (3GPP), Mobile Competence Centre ; 650, Route Des Lucioles ; F-06921 Sophia-Antipolis Cedex ; FRANCE, vol. SA WG2, No. Beijing; Apr. 18, 2007, Apr. 18, 2007 (Apr. 18, 2007), XP050259531.
"3rd Generation Partnership Project; Technical Specification Group Services and System Aspects; Study on Machine-Type Communications (MTC) and other mobile data applications communications enhancements (Release 12)", 3GPP Standard; 3GPP TR 23.887, 3rd Generation Partnership Project (3GPP), Mobile Competence Centre ; 650, Route Des Lucioles ; F-06921 Sophia-Antipolis Cedex ; France, vol. SA WG2, No. V12.0.0, Dec. 20, 2013 (Dec. 20, 2013), pp. 1-151, XP050729146.
"3rd Generation Partnership Project; Technical Specification Group Services and System Aspects; Circuit Switched (CS) fallback in Evolved Packet System (EPS); Stage 2 (Release 12)", 3GPP Standard; 3GPP TS 23.272, 3rd Generation Partnership Project (3GPP), Mobile Competence Centre ; 650, Route Des Lucioles ; F-06921 Sophia-Antipolis Cedex ; France, vol. SA WG2, No. V12.4.0, Sep. 22, 2014 (Sep. 22, 2014), pp. 1-100, XP050925553.
"3rd Generation Partnership Project; Technical Specification Group Core Network and Terminals; Technical realization of the Short Message Service (SMS) (Release 12)", 3GPP Standard; 3GPP TS 23.040, 3rd Generation Partnership Project (3GPP), Mobile Competence Centre ; 650, Route Des Lucioles ; F-06921 Sophia-Antipolis Cedex ; France, vol. CT WG1, No. V12.2.0, Dec. 19, 2013 (Dec. 19, 2013), pp. 1-209, XP050729048.
"3rd Generation Partnership Project; Technical Specification Group Services and System Aspects; Functional stage 2 description of Location Services (LCS) (Release 12)", 3GPP Standard; 3GPP TS 23.271, 3rd Generation Partnership Project (3GPP), Mobile Competence Centre ; 650, Route Des Lucioles ; F-06921 Sophia-Antipolis Cedex ; France, vol. SA WG2, No. V12.1.0, Jun. 20, 2014 (Jun. 20, 2014), pp. 1-169, XP050774105.
"3rd Generation Partnership Project; Technical Specification Group Core Network and Terminals; Location Services (LCS); Evolved Packet Core (EPC) LCS Protocol (ELP) between the Gateway Mobile Location Centre (GMLC) and the Mobile Management Entity (MME); SLg interface (Release 12)", 3GPP Standard; 3GPP TS 29.172, 3rd Generation Partnership Project (3GPP), Mobile Competence Centre ; 650, Route Des Lucioles ; F-06921 Sophia-Antipolis Cedex ; France, vol. CT WG4, No. V12.4.0, Mar. 10, 2014 (Mar. 10, 2014), pp. 1-38, XP050769647.
Nsn et al.: "Further analysis of extended DRX cycle for UEPCOP", vol. RAN WG2, No. Ljubljana, Slovenia; Oct. 7, 2013-Oct. 11, 2013, Sep. 27, 2013 (Sep. 27, 2013), XP050718912, Retrieved from the Internet <URL:http://www.3gpp.org/ftp/tsg_ran/WG2_RL2/TSGR2_83bis/Docs/> [retrieved on Sep. 27, 2013].
LG Electronics: "Question about the necessity of the Default Extended DRX cycle", vol. SA WG2, No. Xiamen, P.R. China; Sep. 18, 2013-Sep. 27, 2013, Sep. 18, 2013 (Sep. 18, 2013), XP050726807, Retrieved from the Internet <URL:http://www.3gpp.org/ftp/tsg_sa/WG2_Arch/TSGS2_99_Xiamen/Docs/> [retrieved on Sep. 18, 2013].
International Search Report PCT/ISA/210 for International Application No. PCT/EP2015/075468 dated Nov. 2, 2015.
Written Opinion of the International Searching Authority PCT/ISA/237 for International Application No. PCT/EP2015/075468 dated Nov. 2, 2015.
Office Action dated Feb. 28, 2019, issued in corresponding Korean Application No. 10-2017-7015262.
Korean Office Action dated Jul. 5, 2019 for Korean Patent Application No. 10-2017-7015262.

(56) References Cited

OTHER PUBLICATIONS

Chinese Office Action dated Sep. 2, 2019 for CN Application No. 201580071386.8.
Chinese Office Action dated Jul. 13, 2020 for CN Application No. 201580071386.8.
Office Action dated Jul. 13, 2020 in Indian Application No. 201717016485.
Ericsson, "Potential Solution for buffering at DL transmission to PSM", vol. SA WG2, Meeting #S2-105 (S2-143060), Oct. 13-17, 2014, Sapporo, Japan.

* cited by examiner

SUPPORT OF MOBILE-TERMINATED COMMUNICATION IN AN EVOLVED PACKET SYSTEM

CROSS-REFERENCE TO RELATED APPLICATIONS

This application is a national phase under 35 U.S.C. § 371 of PCT International Application No. PCT/EP2015/075468 which has an International filing date of Nov. 2, 2015, which claims priority to European Application No. 14306767.6, filed Nov. 4, 2014, the entire contents of each of which are hereby incorporated by reference.

The present invention generally relates to packet mobile communication networks and systems.

Descriptions of packet mobile networks and systems can be found in the literature, such as in particular in Technical Specifications published by standardization bodies such as for example 3GPP (3$^{rd}$ Generation Partnership Project).

An example of packet mobile system is EPS (Evolved Packet System). An EPS network comprises a Core Network called EPC (Evolved Packet Core) that can be accessed via different access networks including E-UTRAN access or GERAN/UTRAN access. EPC nodes in particular include Mobility Management Entity (MME) for E-UTRAN access, Serving GPRS Support Node (SGSN) for GERAN/UTRAN access, Serving Gateway (SGW) and PDN Gateway (PDN GW). EPS is specified in particular in 3GPP TS 23.401 for E-UTRAN access and in 3GPP TS 23.060 for GERAN/UTRAN access. An example of architecture for EPS is recalled in FIG. 1 taken from 3GPP TS 23.401.

In a system such as EPS, a User Equipment (UE) may communicate with various applications in various external networks (also referred to as Packet Data Network PDN), via an EPS network providing communication services, including providing connectivity (referred to as PDN connectivity, or IP connectivity) between the UE and a PDN represented by a PDN identifier such as Access Point Name APN.

Mobile terminated communications towards UEs in idle mode are supported in a system such as EPS via a network triggered service request procedure, defined in 3GPP TS 23.401.

Optimizations or enhancements are now introduced in such networks and systems, for the support of new types of communications having new service requirements, such as Machine Type Communications (MTC) also known as Internet of Things (IoT).

An example of such new service requirements is that mechanisms should be provided for MTC Device triggering, allowing the network to trigger a MTC Device (or UE equipped for MTC) to initiate communication with a MTC Server based on a trigger indication received from the MTC Server.

Mechanisms for Device triggering are described in particular in 3GPP TS 23.682 specifying architecture enhancements to facilitate communications with packet data networks and applications. An example of triggering flow over user plane, wherein a DT-AS (Device Trigger Application Server) delivers the trigger to the UE over the user plane, is recalled in FIG. 2 taken from 3GPP TS 23.682, Annex D, Figure D-1. Triggering over control plane (using Short Message Service SMS) is also described in 3GPP TS 23.682.

Another example of such new service requirements is that mechanisms should be provided to lower the power consumption of MTC Devices.

An example of mechanism to lower the power consumption of Devices (or User Equipments), called UE Power Saving Mode (PSM) is specified in particular in 3GPP TS 23.682 and 3GPP TS 23.401. A UE may adopt the PSM for reducing its power consumption. That mode is similar to power-off, but the UE remains registered with the network and there is no need to re-attach or re-establish PDN connections. A UE in PSM is not immediately reachable for mobile terminating services. A UE using PSM is available for mobile terminating services only for the period of an Active Time after a mobile originated event like data transfer or signalling, e.g. after a periodic TAU/RAU (Tracking Area Update/Routing Area Update) procedure.

Another example of mechanism to lower the power consumption of Devices (or User Equipments), called Extended DRX (Discontinuous Reception) is considered in particular in 3GPP TR 23.887. A UE with extended DRX applies longer period of discontinuous reception, up to several minutes, between the times when it wakes up to listens to possible paging occurrences.

As recognized by the inventors, and as will be explained with more detail later, there is a need to improve the support of mobile-terminated communication (such as Device Triggering) towards an UE in idle mode using a power saving mechanism whereby the UE is transiently non reachable (examples of such power saving mechanism including, though not limited to, Power Saving Mode or Extended DRX). For example, there is a need to avoid network load increase due to deletion of DL (Downlink) packets towards an UE in PSM mode, causing DL packet retransmissions by retransmission schemes on higher layers. There is also a need to improve reachability of UEs in idle mode using such power saving mechanism.

As also recognized by the inventors, there is a need to improve the support of Mobile Terminated SMS for a User Equipment UE using extended DRX.

As also recognized by the inventors, there is a need to improve the support of Mobile Terminated Location Request towards a User Equipment UE using a power saving mechanism whereby the UE is transiently not reachable (examples of such power saving mechanism including, though not limited to, Power Saving Mode or Extended DRX).

Embodiments of the present invention in particular address such needs.

These and other objects are achieved, in one aspect, by a method for support of mobile-terminated communication in an Evolved Packet System, towards a User Equipment UE in idle mode using a power saving mechanism whereby said UE is transiently not reachable, said method comprising:
  allowing one or more Downlink DL packets received for said UE to be buffered in a Serving Gateway SGW, upon request, for up to a duration referred to as DL buffering duration.

These and other objects are achieved, in another aspect, by a method for support of Mobile Terminated SMS for a User Equipment UE in idle mode using extended DRX, said method comprising:
  upon receipt of said Mobile Terminated SMS, a Mobility management Entity MME or a Serving GPRS Support Node SGSN serving said UE immediately reporting towards a Short Message Service Centre SMSC that the UE is not reachable, and paging the UE,
  upon receipt of a paging response from the UE, the MME or the SGSN alerting the SMSC via the HSS to trigger the SMSC to re-send the SMS.

These and other objects are achieved, in another aspect, by a method for support of Mobile Terminated Location Request towards a User Equipment UE using a power saving mechanism whereby the UE is transiently not reachable, said method comprising:
  upon receipt of a network initiated location request from a Gateway Mobile Location Centre GMLC, a Mobility management Entity MME or a Serving GPRS Support Node SGSN, serving said UE immediately returning an answer towards the GMLC containing a last known location for the UE, with an indication that the UE is transiently not reachable, and paging the UE if the UE is using extended DRX,
  upon receipt of a paging response from the UE or upon the next signalling activity for the UE, the MME or the SGSN sending towards the GMLC a Subscriber Location Report.

These and other objects are achieved, in other aspects, by entities configured for performing at least one step of such method(s), said entities including, in particular (though not exclusively) in an EPS network: Serving Gateway SGW, Mobility Management Entity MME, Serving GPRS Support Node SGSN, Home Subscriber Server HSS.

Figure 2:
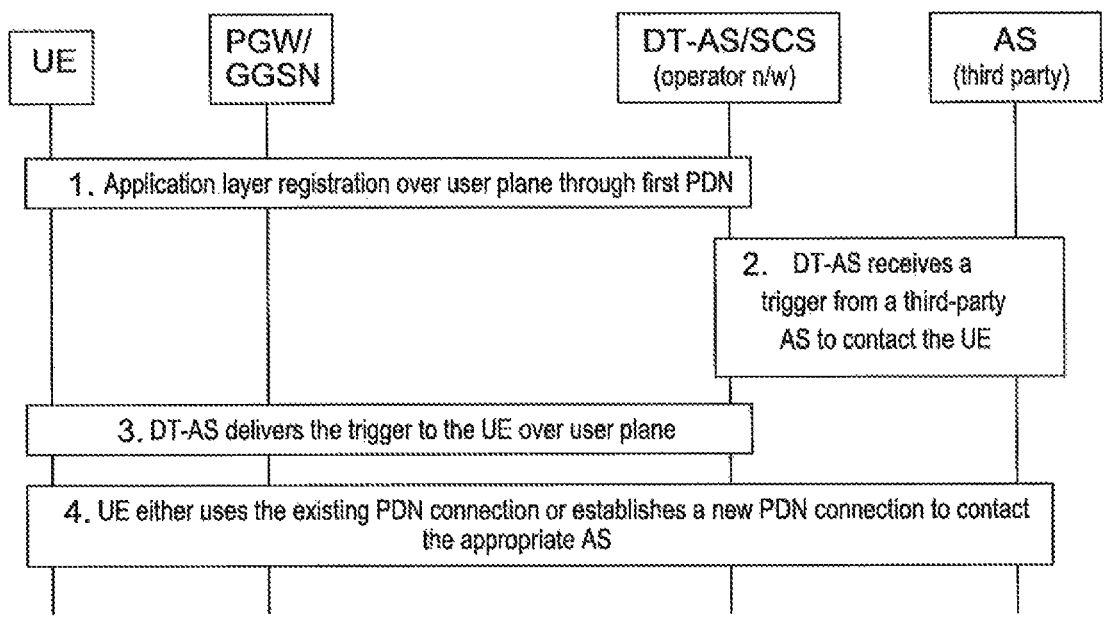
Figure 3:
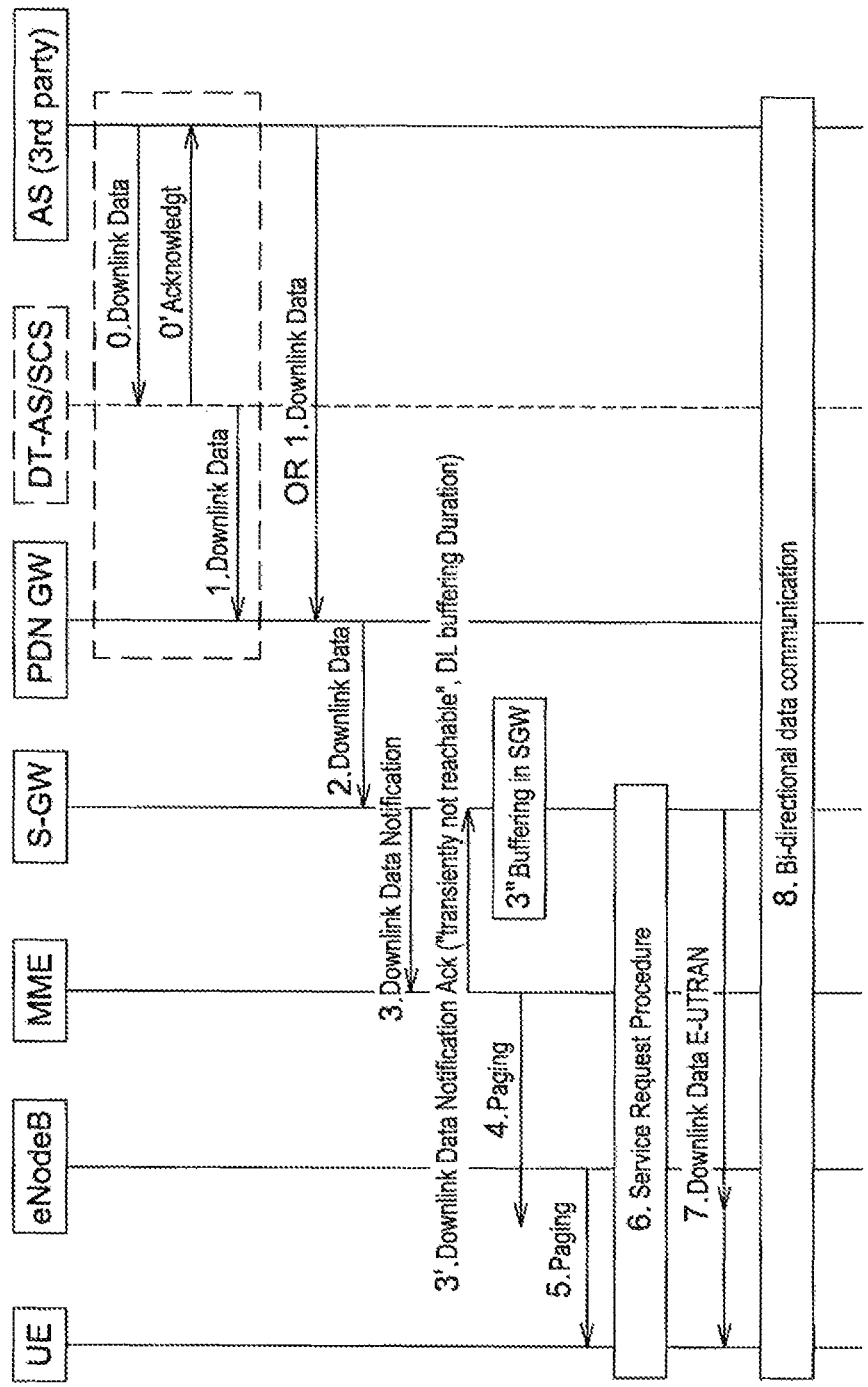
Figure 4:
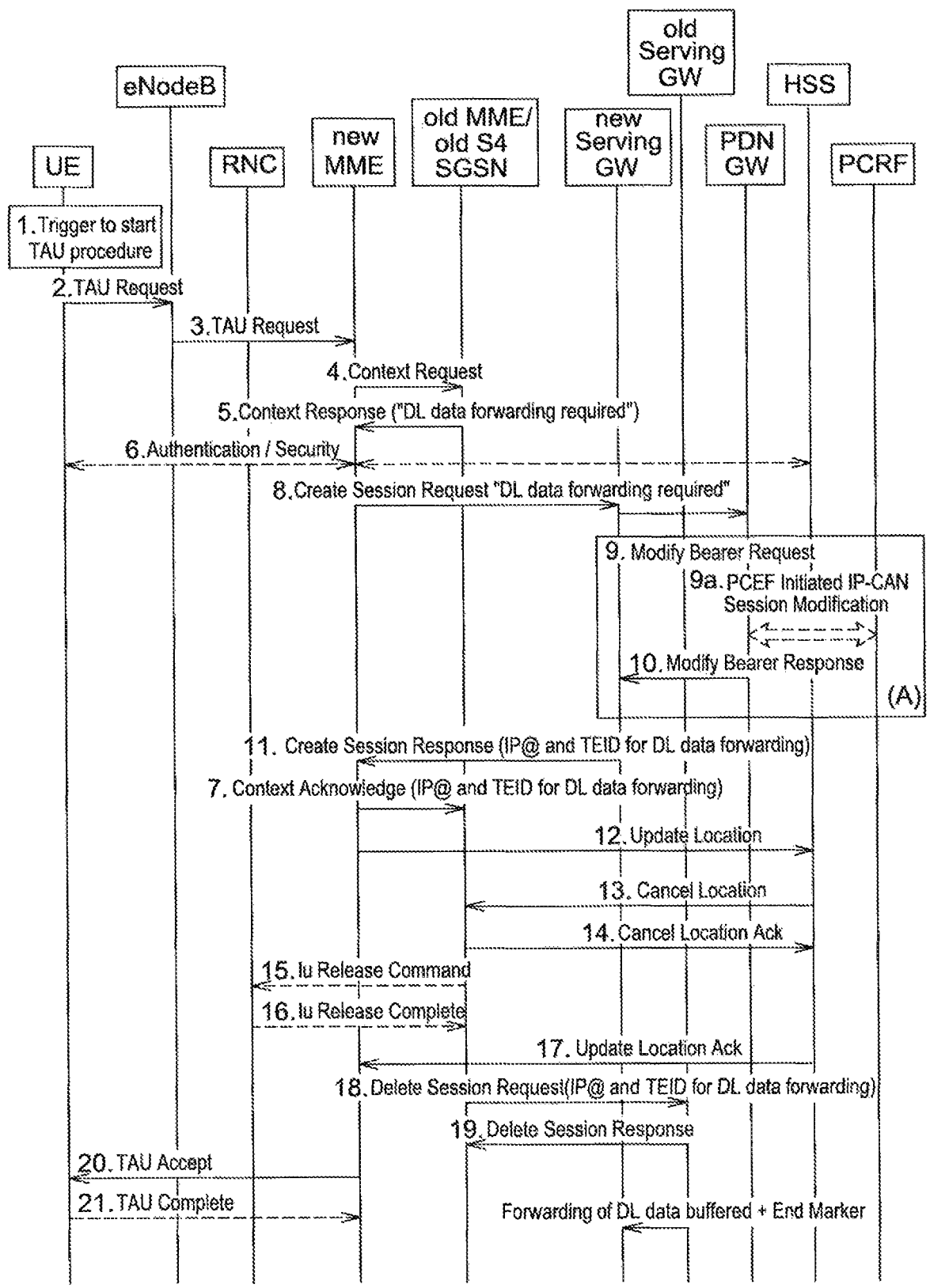
Figure 5:
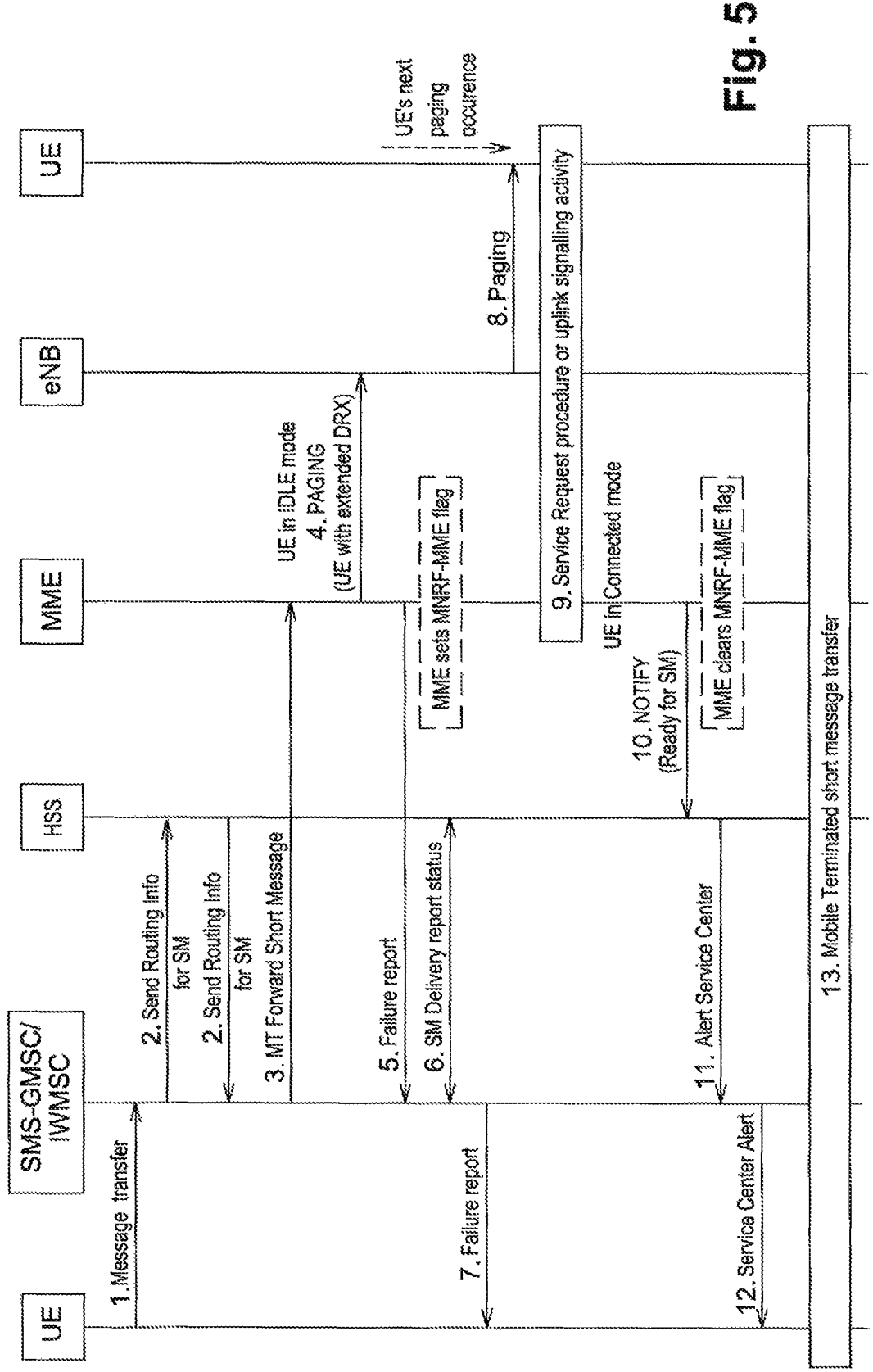
Figure 6:
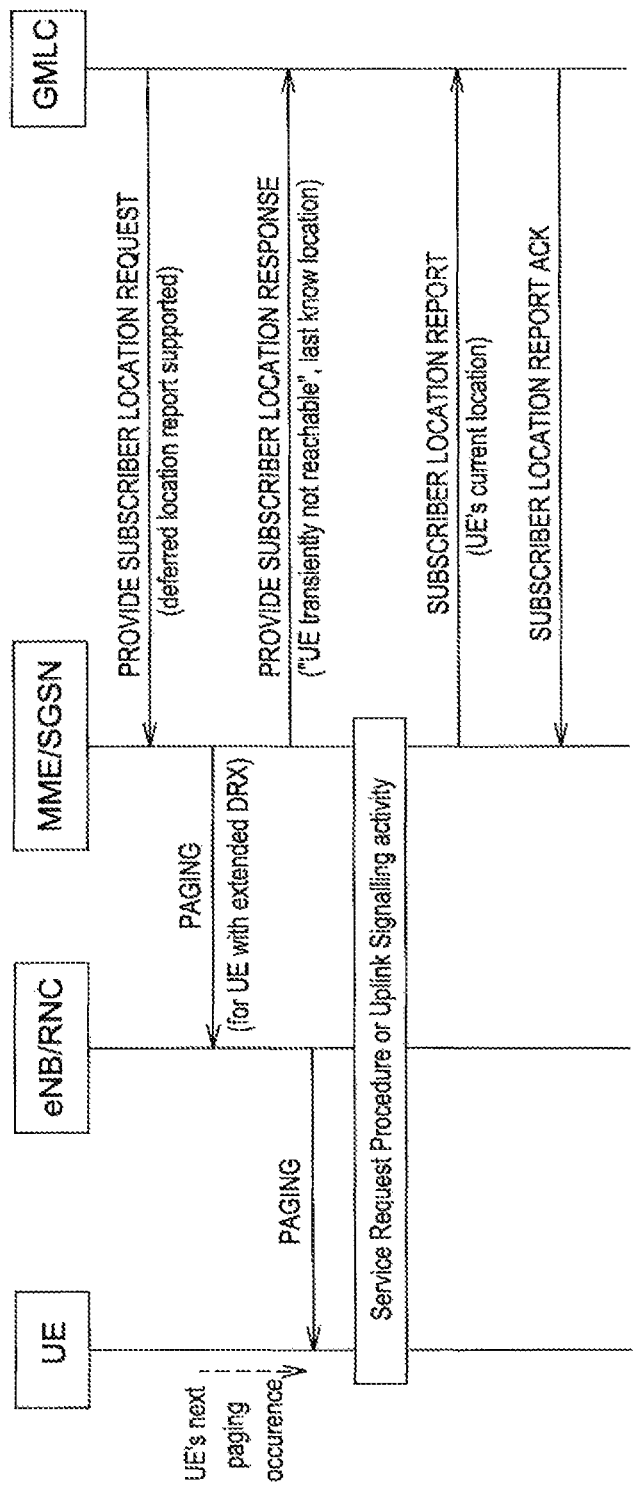

Some embodiments of apparatus and/or methods in accordance with embodiments of the present invention are now described, by way of example only, and with reference to the accompanying drawings, in which:

FIG. 1 is intended to recall an example of EPS architecture,

FIG. 2 is intended to recall an example flow for user-plane device triggering, FIG. 3 is intended to illustrate an example flow for user-plane device triggering towards an UE in idle mode using a power saving mechanism whereby the UE is transiently not reachable, according to embodiments of the present invention, FIG. 4 is intended to illustrate an example flow for Tracking Area Update TAU procedure with an SGW change, for support of mobile terminated communication towards an UE in idle mode using a power saving mechanism whereby the UE is transiently not reachable, according to embodiments of the present invention, whereby the Downlink DL packet(s) buffered at the old SGW are forwarded to the new SGW;

FIG. 5 is intended to illustrate an example flow for Mobile Terminating Short Message for UE with extended DRX, according to embodiments of the present invention, FIG. 6 is intended to illustrate an example flow for Mobile Terminating Location Request towards an UE in idle mode using a power saving mechanism whereby the UE is transiently not reachable, according to embodiments of the present invention.

The description below is made by way of example for a mobile system corresponding to 3GPP Evolved Packet System EPS. It should however be understood that some embodiments of the present invention are not limited to 3GPP EPS.

The Internet-of-Things (IoT) is a concept where many things (e.g., devices) can be uniquely identified and communicated with. One study forecasted that the number of devices representing the IoT will grow to 26 Billion units by 2020. Many of these devices will be constrained in terms of low-cost, low-energy and low-bitrate.

3GPP has specified a new Power Saving Mode feature (PSM) in Release 12 (see 3GPP TS 23.401 and 23,682), whereby the UE enters long sleep periods during which the UE remains registered in the network but is no longer reachable, 3GPP is further considering extending the DRX period (discontinuous reception period, i.e. the period at which the UE may receive paging requests from the network) of UEs in idle mode in Release 13, to several minutes (e.g. 5, 10 or 15 minutes) to provide more battery saving gains for UEs which require to support Mobile Terminated data communications. See for example document 3GPP S2-143324.

Mobile terminating data communications towards UEs in PSM or with an extended DRX period would be inefficient in many aspects with the current network behaviour, which is reminded below:
  When downlink data is sent to a UE that is in ECM-IDLE mode, at least one IP packet is buffered in the SGW and the UE is paged. When the UE responds to the paging, the buffered IP packets are transmitted to the UE.
  When downlink data is sent to a UE that is in ECM-IDLE mode and is applying a sleep mode function e.g. PSM, the IP packets are discarded in the SGW. No paging is done of the UE.

Issues the packet discard behaviour of the current system may lead to include:
  Higher load on the network, caused by the retransmission schemes applied by transport or application protocols to ensure a successful transmission of packets (e.g. causing additional Downlink Data Notification signalling from SGW to MME/SGSN, requiring additional resources at the sender/application server side, sender side falling back to SMS-based device triggering via the Tsp interface after retransmission timeout causing additional signalling and processing in the entire network);
  Difficulty to reach devices that use power saving mechanisms, that could make cellular a less preferred choice for Internet-of-Things and MTC applications.

The very large number of such devices makes it especially important that the 3GPP access is efficient when accessing these constrained devices. 3GPP is thus in the process of studying optimizations to the EPS to support Mobile Terminated data communications with UEs (devices) which are not reachable for a long period (e.g. several minutes or more). Applications at the network side may trigger the devices using the Tsp reference point (towards an MTC-IWF) and SMS-based delivery mechanisms, as per 3GPP TS 23.682. But this would entail very inefficient downlink data transmission, due to excessive signalling and processing in many network entities (MTC-IWF, HSS, SMS Service Center, MME, SGSN, MSC) to trigger the device via SMS upon every downlink data communication. In the case of extended DRX to be up to 5 minutes, also, it is in principle efficient to have the data ready in the SGW for DL delivery rather than just trigger by SMS.

There is a need for a different approach, in particular avoiding above-mentioned drawbacks. Embodiments and/or aspects of the invention in particular address such needs.

Some embodiments and/or aspects of the invention, related to support of mobile terminated communication (e.g. device triggering) towards a UE in idle mode using a power saving mechanism whereby the UE is transiently not reachable (e.g. UE in PSM or using Extended DRX), are based on following ideas:
  In situations where the UE's IP connectivity is established (i.e the UE has already established a PDN connection), the UE IP address is known and a NAT or firewall isn't blocking downlink packet transmission, the applications on the network side trigger the device via the established IP connectivity (i.e. PDN connection), and with the SGW being instructed by the MME/SGSN to store the DL user plane packet (encapsulating the device trigger request) for up to a duration covering one or more DRX periods of the UE. Also, this may work for PSM (power saving mode) by indicating a storage period equal to the PSM periodic TAU or RAU value sent to the UE.

Some embodiments and/or aspects of the invention, related to support of mobile terminated communication (e.g. device triggering) towards a UE in idle mode using a power saving mechanism whereby the UE is transiently not reachable (e.g. UE in PSM or using Extended DRX), will now be described in connection with the example flow of FIG. 3.

When desiring to initiate data communication with a UE making use of a power saving mechanism (e.g. PSM or extended DRX), the application (at the network side) may send a device trigger request to the UE:

a) by sending a downlink user plane packet towards the IP address of the UE, optionally via an intermediate SCS (Service Capability Server) that acknowledges receipt of the packet, if IP connectivity is available (normal case); as per figure D-1 of 3GPP TS 23.682.

b) or using the Tsp and SMS delivery mechanism otherwise (as per subclause 5.2.1 of TS 23.682)

Note 1: use of device triggering for UEs in extended DRX mode is new.

In some embodiments, one or more of following steps may be provided, referring to the example flow of FIG. 3.

Some of these steps may require modifications to be introduced in the network triggered service request procedure (as defined in particular in 3GPP TS 23.401).

The PGW forwards the DL user plane packet to the SGW over the S5/S8-U bearer, per existing procedures.

Upon receipt of the DL user plane packet (encapsulating the device trigger); the SGW sends a Downlink Data Notification (DDN) request to the MME or SGSN (depending on whether the UE is under E-UTRAN or UTRAN/GERAN coverage), per existing procedure.

Based on operator policies (e.g. user's subscription; the APN for which a DL packet was received); if the UE has negotiated with the network the use of a power saving mechanism (e.g. PSM, extended DRX), the MME/SGSN decides whether to proceed with the DDN request (normal case) or reject it.

When proceeding with the request, the MME or SGSN initiates the Network Triggered service request procedure (as specified in TS 23.401 subclause 5.3.4.3 and TS 23.060), i.e. sends a paging request towards eNBs or RNCs pertaining to the desired paging area. The eNBs or RNCs store the paging request until the next paging occurrence of the UE. As an exception for UEs in PSM mode, the MME/SGSN does not page the UE (cf step 3 in FIG. 5.3.4.3-1 of TS 23.401) but waits for the next uplink signalling activity of the UE (e.g. next periodic TAU/RAU request) to trigger the Service Request procedure (step 5 and following steps).

Note 2: UEs do not listen to paging channels when in PSM.

In the Downlink Data Notification Acknowledge, the MME or SGSN indicates to the SGW that the UE is "transiently not reachable" (e.g. new value of the Cause IE in DDN Acknowledge message, see 3GPP TS 29.274 subclause 7.2.11.2) and provides the SGW with the duration up to which the SGW can buffer the downlink packets for that UE (via a new DL Buffering Duration IE added to the DDN Acknowledge message). This duration is set such as to cover the duration of one or more DRX periods for a UE with extended DRX OR the PSM specific periodic TAU/RAU value for a UE in PSM.

Note 3: "more DRX periods" aims at accommodating cases where paging the UE at its first DRX occurrence would fail (e.g. UE not reachable or paging channel overload).

Note 4: for UEs in PSM, the MME/SGSN may estimate a shorter buffering time in the SGW based on the periodic TAU/RAU timer and the time elapsed since the last UE signalling procedure.

The DDN Acknowledge message to the SGW may also contain a limit to the number of buffered DL packets per PDN connection or per UE for the UE (there can be a per UE or per APN subscription to the buffering—if a APN has zero set for buffering, then the SGW discards DL data for this APN PDN connection when the device is transiently not reachable). If subsequent DL data arrives after this notification, no more DDN is triggered and data is stored up to the indicated packets limit.

Note 5: the SGW may alternatively be configured with the limit to the number of buffered DL packets per APN and/or per UE.

The MME/SGSN may determine whether the SGW supports the extensions defined by this invention by configuration, or e.g. by the SGW notifying support of this feature/extensions via GTP-C signalling to MME/SGSN (using the existing feature discovery mechanism, see 3GPP TS 29.274 clause 11).

Upon receipt of that response, the SGW buffers the downlink packets received for that UE until either the UE responds to the paging request (UE with extended DRX) or triggers any uplink signalling (UE with extended DRX or PSM) and establishes downlink user radio and S1-U bearers, as per the existing Service Request procedure (see TS 23.401 subclause 5.3.4.3 and 23.060), or the duration provided by the MME/SGSN elapses (in which case the SGW drops the DL packets for that UE), whichever occurs first. In the former case, user plane exchanges can then take place between the UE and the application at the network side.

When rejecting the request, the MME or SGSN sends a Downlink Data Notification Acknowledge with the indication that the UE is not reachable (per existing procedure). The SGW then drops the downlink packets and ceases to send downlink data notification requests for subsequent DL user packets received during a given period.

Some embodiments and/or aspects of the invention are related to a Tracking Area Update or Routing Area Update procedure for support of mobile terminated communication (e.g. device triggering) towards an UE in idle mode using a power saving mechanism whereby the UE is transiently not reachable (e.g. UE in PSM or using Extended DRX). Such embodiments and/or aspects of the invention will now be described in connection with the example flow of FIG. 4, by way of example for the TAU procedure. Though not illustrated by a specific example flow, such embodiments and/or aspects of the invention also apply to the Routing Area Update RAU procedure.

In some embodiments, one or more of following steps may be provided, referring to the example flow of FIG. 4.

Some of these steps may require modifications to be introduced in the Tracking Area Update TAU procedure (as defined in particular in 3GPP TS 23.401). Though not illustrated, similar modifications may require to be introduced in the Routing Area Update RAU procedure (as defined in particular in 3GPP TS 23.401 or 3GPP TS 23.060).

If the UE initiates an intra MME Tracking Area Update (TAU) or intra SGSN Routing Area Update (RAU) (i.e. UE moving to a new Tracking Area/Routing Area) before responding to paging, the MME or SGSN leverages the signalling connection used for the TAU/RAU signalling to establish DL connectivity at that time to transfer DL packets (as per existing procedure—TS 23.401 subclause 5.3.4.3: "If the MME already has a signalling connection over S1-MME towards the UE but the S1-U tunnel has not yet been established, then the messages sequence performed start from the step when MME establishes the bearer(s).")

Upon an inter-MME TAU or inter-SGSN TAU, i.e. when the UE moves to a different CN node, the new MME or SGSN behaves as per existing TAU or RAU procedure (see e.g. TS 23.401 subclause 5.3.1); during that procedure, the new MME or SGSN takes over the control of the SGW, by sending a GTP-C Modify Bearer Request to the SGW (e.g. see step 9 of TS 23.401 FIG. 5.3.3.1-1). The SGW then sends a new Downlink Data Notification to the new MME/SGSN if DL data are still buffered in the SGW for that UE.

If the UE does a TAU/RAU which requires an SGW change, if the MME/SGSN has requested the old SGW to buffer some data, the MME/SGSN requests the new SGW to provide a GTP-U IP@/TEID for DL data forwarding, to allow the old SGW to forward the buffered DL packets to the new SGW. E.g. taking the example of a TAU with SGW change (see TS 23.401 subclause 5.3.3.1), the MME requests the new SGW in the Create Session Request (step 8, new IE) to provide an IP@ and TEID for DL data forwarding, which the new SGW provides in the Create Session Response (step 11 new IE). The MME passes on the new SGWs IP@ and TEID to the old SGW in the Delete Session Request (step 18, new IEs). The old SGW forwards any DL buffered packets to the new SGW, and once done, send one or more GTP-U End Markers packets (existing message, see TS 29.281) to inform the new SGW that no new DL packets need to be forwarded. In inter-MME/SGSN Inter-SGW mobility scenario, the old MME/SGSN indicates in the Context Response message whether DL data needs to be forwarded to the target SGW, and if so, the new MME/SGSN passes on the new SGW IP@ and TEID for DL data forwarding in the Context Acknowledge (e.g. step 7 in TS 23.401 subclause 5.3.1, which shall then take place after step 11).

Note 6: Handover scenarios already support transfer of DL packets from old to new SGW. See e.g. TS 23.401 subclause 5.5.1.2.2 steps 6 and 8. See also TS 29.281 subclause 13.2, DL data forwarding is currently not supported though for TAU/RAU, but is added as part of embodiments and/or aspects of the invention.

Some embodiments and/or aspects of the invention, related to support of Mobile Terminated SMS for a User Equipment UE in idle mode using extended DRX, will now be described in connection with the example flow of FIG. 5. The Short Message Service (SMS) for EPS network supported via "SMS in MME" is considered by way of example in FIG. 5.

In some embodiments, a serving node MME or SGSN is enhanced to support delivery of SMS for UEs in idle mode using extended DRX, based on one or more of following steps.

Upon receipt of a Mobile Terminated SMS (as illustrated at step 3), the MME or SGSN pages the UE at once (as illustrated at step 4), and responds to the SMSC (as illustrated at step 5) that the UE is not reachable and that the SMSC will be alerted at the next activity of the UE (such response can use existing procedures, see TS 23.272 Annex 0.6, with MME setting the Mobile-Not-Reachable flag).

The eNB then pages the UE at a next UE's paging occurrence, as illustrated at step 8.

Upon receipt of the paging response (during a service request procedure) or upon uplink signaling activity, as illustrated at step 9, the MME or SGSN alerts the SMSC via the HSS to trigger the SMSC to re-send the SMS as illustrated at step 10 (per existing procedures, see TS 23.272 Annex C.6, i.e. with e.g. MME sending a Ready for SM message to the HSS and the HSS triggering the SMS alert procedure as defined in TS 23.040).

Some embodiments and/or aspects of the invention, related to support of Mobile Terminated Location Request towards a UE in idle mode using a power saving mechanism (such as Power saving Mode PSM or Extended DRX) whereby the UE is transiently not reachable, will now be described in connection with the example flow of FIG. 6.

Some of these steps may require modifications to be introduced in the Mobile Terminating Location Request procedure (as defined by 3GPP TS 23.271).

In some embodiments, a MME or SGSN is enhanced to support EPC Mobile Terminated Location Request (see TS 23.271, subclause 9.1.15) towards UEs using a power saving mechanism, based on one or more of following steps.

Upon receipt of a network initiated location request from a GMLC (Provide Subscriber Location Request), the MME or SGSN returns an answer (Provide Subscriber Location Response) immediately to the GMLC, containing the last known location, with the optional indication that the UE is "transiently not reachable". If this optional indication is set, the MME or SGSN also stores the address of the GMLC.

The MME/SGSN also pages the UE if the UE is using extended DRX. Upon receipt of the paging response from the UE, or upon the next uplink signalling activity for a UE (for UEs using extended DRX or PSM), the MME or SGSN sends a Subscriber Location Report (with the UE's current location) to the GMLC (as if this was an EPC network induced Location Request, see TS 23.271 subclause 9.1.17; or TS 29.172 subclause 6.3.2). This assumes the GMLC has indicated support of this new procedure ("deferred location report supported") in the original Provide Subscriber Location Request.

If the UE moves to another MME/SGSN change prior to reporting the location to the GMLC, the old MME/SGSN sends a Subscriber Location Report to the GMLC with the indication that it cannot proceed with the request as a result of UE mobility. The GMLC may reiterate then its request towards the new MME/SGSN.

It is assumed that UEs configured with power saving mechanisms do not use dedicated EPS bearers (e.g. this is the case of MTC communications), and thus any PGW initiated signalling (e.g. GTP-C Create Bearer Request) received by the MME or SGSN for such UEs are rejected. Note that otherwise, it would also be possible for the MME/SGSN to reject the request with the indication that the UE is transiently not reachable; and to wake up the PGW by sending a Modify Bearer Request message when the UE responds to the page request to let the PGW know that the UE is reachable.

Some embodiments and/or aspects of the invention enable to support efficient downlink data communication in EPS for UEs or devices configured with power saving mechanisms, e.g; Power Saving Mode or extended DRX period. Especially for applications constrained by cost and low operator ARPU, it should be preferential to avoid high usage of SMS based device triggering for a large number of MTC devices.

Some embodiments and/or aspects of the invention present the following main benefits:

minimum impacts for 3rd party applications and EPS require minimum buffering in the EPC (just the device triggers), since application does not start downlink data transfers until getting the trigger response from the UE no buffering of other applicative packets that may be worthless to buffer anyway (e.g. TCP).

In one aspect, there is provided a method for support of mobile-terminated communication in an Evolved Packet System, towards a User Equipment UE in idle mode using a power saving mechanism whereby said UE is transiently not reachable.

Various embodiments are provided, which may be taken alone or in combination, according to various combinations, including (though not limited to) following embodiments.

In an embodiment, said method comprises:
allowing one or more Downlink DL packets received for said UE to be buffered in a Serving Gateway SGW, upon request, for up to a duration referred to as DL buffering duration.

In an embodiment, said method comprises:
a serving MME or a serving SGSN sending said request to said SGW, such as in a Downlink Data Notification Acknowledge message or in a Downlink Data Notification Failure Indication message.

In an embodiment:
said request includes one or more of: an indication that said UE is transiently not reachable, said DL buffering duration, a limit to the number of buffered DL packets for the UE or per Packet Data Network PDN connection for the UE.

In an embodiment:
said buffering is controlled via user's subscription data stored in a Home Subscriber Server HSS or via the serving MME or SGSN's operator's policy configured in said serving MME or SGSN.

In an embodiment, said method comprises:
upon TAU, respectively RAU, requiring a change of Serving Gateway SGW, from an old SGW to a new SGW, allowing said one or more DL packets buffered in the old SGW to be forwarded to the new SGW.

In an embodiment, said method comprises:
upon TAU, respectively RAU, requiring a change of Serving Gateway SGW, from an old SGW to a new SGW, a serving MME, respectively SGSN, requesting the new SGW, such as in a Create Session Request message, to provide addressing information for forwarding of said one or more buffered DL packets from said old SGW to said new SGW.

In an embodiment, said method comprises:
upon TAU, respectively RAU, requiring a change of Serving Gateway SGW, from an old SGW to a new SGW, the new SGW providing to a serving MME, respectively SGSN, such as in a Create Session Response message, addressing information for forwarding of said one or more buffered DL packets from said old SGW to said new SGW.

In an embodiment, said method comprises:
upon TAU, respectively RAU, requiring a change of Serving Gateway SGW, from an old SGW to a new SGW, a serving MME, respectively SGSN, providing to the old SGW, such as in a Delete Session Request message, addressing information for forwarding of said one or more buffered DL packets from said old SGW to said new SGW.

In an embodiment, said method comprises:
upon TAU, respectively RAU, requiring a change of Serving Gateway SGW, from an old SGW to a new SGW, the old SGW forwarding said one or more buffered DL packets to the new SGW, and once done, sending one or more GTP_U End Markers Packets.

In an embodiment, said method comprises:
upon TAU, respectively RAU, requiring a change of Serving Gateway SGW from an old SGW to a new SGW, and a change of serving node from an old MME or old SGSN to a new MME, respectively a change of serving node from an old MME or old SGSN to a new SGSN, the old MME or old SGSN sending to the new MME, respectively to the new SGSN, such as in a Context Response message, an indication that forwarding of said one or more buffered DL packets from said old SGW to said new SGW is required.

In an embodiment, said method comprises:
upon TAU, respectively RAU, requiring a change of Serving Gateway SGW from an old SGW to a new SGW, and a change of serving node from an old MME or old SGSN to a new MME, respectively a change of serving node from an old MME or old SGSN to a new SGSN, the new MME, respectively the new SGSN, passing to the old MME or old SGSN, such as in a Context Acknowledge message, addressing information for forwarding of said one or more buffered DL packets to the new SGW.

In an embodiment, said method comprises:
a Serving Gateway SGW signalling to a serving MME or to a serving SGSN its support of said buffering, such as via GTP-C signalling.

In an embodiment, said method comprises:
a serving MME or a serving SGSN determining if a Serving Gateway SGW supports said buffering.

In an embodiment, said method comprises:
a serving MME or a serving SGSN deciding, based on configured operator's policy or user's subscription data received from a Home Subscriber Server HSS, whether or not to reject a Downlink Data Notification Request sent by a Serving Gateway SGW for a UE using a power saving mechanism.

In an embodiment, said method comprises:
in the case of a power saving mechanism corresponding to Extended DRX, allowing said buffering until either the UE responds to a paging request, or said DL buffering duration covering one or more DRX periods elapses, whichever occurs first.

In an embodiment, said method comprises:
in the case of a power saving mechanism corresponding to Power Saving Mode PSM, allowing said buffering until either the UE triggers any uplink signalling, or said DL buffering duration covering the UE's periodic TAU or RAU timer optionally reduced by the time elapsed since the last UE signalling procedure, whichever occurs first.

Other aspects relate to entities for performing related step(s) of such method, said entities including, in particular (though not exclusively), in an EPS network: Serving Gateway SGW, Mobility Management Entity MME, Serving GPRS Support Node SGSN, Home Subscriber Server HSS.

In an aspect, there is provided a Mobility management Entity MME, or a Serving GPRS Support Node SGSN, configured to, in an embodiment:
send to a Serving Gateway SGW, such as in a Downlink Data Notification Acknowledge message, at least one of: an indication that an User Equipment UE in idle mode served by said MME or by said SGSN is transiently not reachable, a Downlink DL buffering duration whereby one or more Downlink DL packets received for said UE should be buffered in said SGW for a duration up to said DL buffering duration.

In another aspect, there is provided a Mobility management Entity MME, respectively a Serving GPRS Support Node SGSN, configured to, in an embodiment:
  send to a Serving Gateway SGW, during a TAU, respectively RAU, procedure requiring a change of Serving Gateway SGW from an old SGW to a new SGW, such as in a Create Session Request message, an indication that forwarding of buffered Downlink DL packets from said old SGW to said new SGW is required.

In another aspect, there is provided a Serving Gateway SGW, configured to, in an embodiment:
  send to a Mobility management Entity MME, respectively to a Serving GPRS Support Node SGSN, during a TAU, respectively RAU, procedure requiring a change of Serving Gateway SGW from an old SGW to said SGW referred to as new SGW, such as in a Create Session Response message, addressing information for forwarding of buffered Downlink DL packets from said old SGW to said new SGW.

In another aspect, there is provided a Mobility management Entity MME, respectively a Serving GPRS Support Node SGSN, configured to, in an embodiment:
  send to a Serving Gateway SGW, during a TAU, respectively RAU, procedure requiring a change of Serving Gateway SGW from an old SGW to a new SGW, such as in a Delete Session Request message, addressing information for forwarding of buffered Downlink DL packets from said old SGW to said new SGW.

In another aspect, there is provided a Serving Gateway SGW, configured to, in an embodiment:
  during a TAU, respectively RAU, procedure requiring a change of Serving Gateway SGW from said SGW referred to as old SGW to a new SGW, forward one or more buffered DL packets to said new SGW, and once done, send one or more GTP_U End Markers Packets.

In another aspect, there is provided a Mobility management Entity MME, or a Serving GPRS Support Node SGSN, configured to, in an embodiment:
  upon TAU, respectively RAU, procedure requiring a change of Serving Gateway SGW from an old SGW to a new SGW, and a change of serving node from said MME or SGSN, referred to as old MME or SGSN, to a new MME, respectively new SGSN, send to the new MME, respectively to the new SGSN, such as in a Context Response message, an indication that forwarding of buffered Downlink DL packets from said old SGW to said new SGW is required.

In another aspect, there is provided a Mobility Management Entity MME, or a Serving GPRS Support Node SGSN, configured to, in an embodiment:
  upon TAU, respectively RAU, requiring a change of Serving Gateway SGW from an old SGW to a new SGW, and a change of serving node from an old MME or SGSN, to a new MME, respectively to a new SGSN, pass to said old MME or SGSN, such as in a Context Acknowledge message, addressing information for forwarding of buffered DL packets from said old SGW to said new SGW.

In another aspect, there is provided a Home Subscriber Server, configured to, in an embodiment:
  store user's subscription data allowing control of buffering in a Serving Gateway, upon request and for up to a duration referred to a DL buffering duration, of Downlink DL packets received for a User Equipment in idle mode using a power saving mechanism whereby said UE is transiently not reachable.

In another aspect, there is provided a method for support of Mobile Terminated SMS for a User Equipment UE in idle mode using extended DRX.

In an embodiment, said method comprises:
  upon receipt of said Mobile Terminated SMS, a Mobility management Entity MME or a Serving GPRS Support Node SGSN serving said UE immediately reporting towards a Short Message Service Centre SMSC that the UE is not reachable, and paging the UE,
  upon receipt of a paging response from the UE, the MME or the SGSN alerting the SMSC via the HSS to trigger the SMSC to re-send the SMS.

Other aspects relate to entities for performing related step(s) of such method, said entities including, in particular (though not exclusively), in an EPS network: Mobility Management Entity MME, Serving GPRS Support Node SGSN.

In an aspect, there is provided a Mobility Management Entity MME or a Serving GPRS Support Node SGSN, configured to, in an embodiment:
  upon receipt of a Mobile Terminated SMS for a User Equipment UE in idle mode using extended DRX served by said MME or said SGSN, immediately report towards a Short Message Service Centre SMSC that the UE is not reachable, and page the UE,
  upon receipt of a paging response from the UE, alert the SMSC via the HSS to trigger the SMSC to re-send the SMS.

In another aspect, there is provided a method for support of Mobile Terminated Location Request towards a User Equipment UE using a power saving mechanism whereby the UE is transiently not reachable.

In an embodiment, said method comprises:
  upon receipt of a network initiated location request from a Gateway Mobile Location Centre GMLC, a Mobility management Entity MME or a Serving GPRS Support Node SGSN, serving said UE immediately returning an answer towards the GMLC containing a last known location for the UE, with an indication that the UE is transiently not reachable, and paging the UE if the UE is using extended DRX,
  upon receipt of a paging response from the UE or upon the next signalling activity for the UE, the MME or the SGSN sending towards the GMLC a Subscriber Location Report.

Other aspects relate to entities for performing related step(s) of such method, said entities including, in particular (though not exclusively), in an EPS network: Mobility Management Entity MME, Serving GPRS Support Node SGSN.

In an aspect, there is provided a Mobility Management Entity MME or a Serving GPRS Support Node SGSN, configured to, in an embodiment:
  upon receipt of a network initiated location request from a Gateway Mobile Location Centre GMLC, immediately return an answer towards the GMLC containing a last known location for a User Equipment UE served by said MME or SGSN, with an indication that the UE is transiently not reachable, and page the UE if the UE is using extended DRX,
  upon receipt of a paging response from the UE or upon the next signalling activity for the UE, send towards the GMLC a Subscriber Location Report.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method comprising:
   during a network triggered service request procedure, a mobility management entity requesting a serving gateway to buffer downlink data for a user equipment in idle mode using a power saving mechanism such that said user equipment is transiently not reachable; and
   during a tracking area update procedure, said mobility management entity acting as an old mobility management entity in said tracking area procedure, sending to a mobility management entity acting as new mobility management entity in said tracking area update procedure, an indication to forward said downlink data, buffered in said serving gateway acting as an old serving gateway in said tracking area update procedure, to a serving gateway acting as a new serving gateway in said tracking area update procedure.

2. The method according to claim 1, comprising:
   during said network triggered service request procedure, requesting said serving gateway to buffer downlink data, within a downlink data notification acknowledgement message including a downlink buffering duration.

3. The method according to claim 1, comprising:
   during said tracking area update procedure, requesting said new serving gateway to provide addressing information for forwarding downlink data buffered in said old serving gateway to said new serving gateway.

4. The method according to claim 1, comprising:
   during said tracking area update procedure, providing to said old serving gateway addressing information for forwarding downlink data buffered in said old serving gateway to said new serving gateway.

5. The method according to claim 1, comprising:
   during said tracking area update procedure, passing to a mobility management entity acting as an old mobility management entity in said tracking area update procedure, addressing information for forwarding downlink data buffered in said old serving gateway to said new serving gateway.

6. The method according to claim 1, comprising:
   during said tracking area update procedure, sending to a mobility management entity acting as a new mobility management entity in said tracking area procedure, in a context response message, an indication whether forwarding downlink data buffered in said old serving gateway to said new serving gateway is required.

7. The method according to claim 1, comprising:
   during said tracking area update procedure, passing to a mobility management entity acting as an old mobility management entity in said tracking area update procedure, in a context acknowledge message, addressing information for forwarding downlink data buffered in said old serving gateway to said new serving gateway.

8. The method according to claim 1, wherein
   said power saving mechanism such that said user equipment is transiently not reachable includes one of a power saving mode, and an extended idle mode discontinuous reception mechanism.

9. An apparatus comprising:
   at least one processor; and
   at least one memory including computer program code;
   the at least one memory and the computer program code configured to, with the at least one processor, cause the apparatus at least to perform
      during a network triggered service request procedure, request a serving gateway to buffer downlink data for a user equipment in idle mode using a power saving mechanism such that said user equipment is transiently not reachable, and
      during a tracking area update procedure, acting as an old mobility management entity in said tracking area update procedure, send to a mobility management entity acting as a new mobility management entity in said tracking area update procedure, an indication to forward said downlink data buffered in said serving gateway acting as an old serving gateway in said tracking area update procedure, to a serving gateway acting as a new serving gateway in said tracking area update procedure.

10. The apparatus according to claim 9, the at least one memory and the computer program code configured to, with the at least one processor, cause the apparatus at least to perform:
    during said network triggered service request procedure, requesting said serving gateway to buffer downlink data, within a downlink data notification acknowledgement message including a downlink buffering duration.

11. The apparatus according to claim 9, the at least one memory and the computer program code configured to, with the at least one processor, cause the apparatus at least to perform:
    during a tracking area update procedure, acting as a new mobility management entity, requesting a new serving gateway to provide addressing information for forwarding downlink data buffered in an old serving gateway to said new serving gateway.

12. The apparatus according to claim 9, the at least one memory and the computer program code configured to, with the at least one processor, cause the apparatus at least to perform:
    during said tracking area update procedure, providing to said old serving gateway addressing information for forwarding downlink data buffered in said old serving gateway to said new serving gateway.

13. The apparatus according to claim 9, the at least one memory and the computer program code configured to, with the at least one processor, cause the apparatus at least to perform:
    during a tracking area update procedure, acting as a new mobility management entity, pass to a mobility management entity acting as an old mobility management entity in said tracking area update procedure, addressing information for forwarding downlink data buffered in an old serving gateway to a new serving gateway.

14. The apparatus according to claim 9, the at least one memory and the computer program code configured to, with the at least one processor, cause the apparatus at least to perform:
    during said tracking area update procedure, send to a mobility management entity acting as a new mobility management entity in said tracking area procedure, in a context response message, an indication whether forwarding downlink data buffered in said old serving gateway to said new serving gateway is required.

15. The apparatus according to claim 9, the at least one memory and the computer program code configured to, with the at least one processor, cause the apparatus at least to perform:

during a tracking area update procedure, acting as a new mobility management entity, pass to a mobility management entity acting as an old mobility management entity in said tracking area update procedure, in a context acknowledge message, addressing information for forwarding downlink data buffered in an old serving gateway to a new serving gateway.

16. The apparatus according to claim 9, wherein
said power saving mechanism such that said user equipment is transiently not reachable includes one of: a power saving mode, and an extended idle mode discontinuous reception mechanism.

\* \* \* \* \*